(12) United States Patent
Brown

(10) Patent No.: US 10,662,877 B2
(45) Date of Patent: May 26, 2020

(54) EMBEDDED AIRCRAFT HEATER REPAIR

(71) Applicant: ROHR, INC., Chula Vista, CA (US)

(72) Inventor: Keith T. Brown, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 762 days.

(21) Appl. No.: 15/284,052

(22) Filed: Oct. 3, 2016

(65) Prior Publication Data

US 2018/0093785 A1 Apr. 5, 2018

(51) Int. Cl.
| | | |
|---|---|---|
| *F02C 7/00* | (2006.01) | |
| *F02C 7/047* | (2006.01) | |
| *B64D 15/12* | (2006.01) | |
| *F01D 25/02* | (2006.01) | |
| *B64F 5/40* | (2017.01) | |
| *B64D 33/02* | (2006.01) | |

(52) U.S. Cl.
CPC .............. *F02C 7/047* (2013.01); *B64D 15/12* (2013.01); *B64F 5/40* (2017.01); *F01D 25/02* (2013.01); *B64D 2033/0233* (2013.01); *F05D 2230/80* (2013.01); *F05D 2270/54* (2013.01)

(58) Field of Classification Search
CPC .................... B64D 15/12; B64D 15/16; B64D 2033/0233; F02C 7/047; F05D 2270/54; F05D 2230/80; B64F 5/40; F01D 25/02
USPC ........................................................ 244/134
See application file for complete search history.

(56) References Cited

U.S. PATENT DOCUMENTS

| | | | | |
|---|---|---|---|---|
| 5,427,332 A * | 6/1995 | Rauckhorst, III | ..... | B64D 15/16 244/134 A |
| 7,469,862 B2 * | 12/2008 | Layland | ................ | B64D 15/12 244/134 D |
| 7,513,458 B2 * | 4/2009 | Layland | ................ | B64D 15/12 244/134 D |
| 7,631,838 B2 * | 12/2009 | Layland | ................ | B64D 15/12 244/134 D |
| 7,681,838 B2 * | 3/2010 | Layland | ................ | B64D 15/12 244/134 D |
| 8,540,185 B2 * | 9/2013 | Vauchel | ................ | B64D 15/12 244/134 D |
| 8,991,763 B2 * | 3/2015 | Guillermond | .......... | B64D 15/12 219/545 |
| 2006/0237582 A1 * | 10/2006 | Layland | ................ | B64D 15/12 244/53 R |
| 2006/0237590 A1 * | 10/2006 | Layland | ................ | B64D 15/12 244/134 R |

\* cited by examiner

*Primary Examiner* — Assres H Woldemaryam
*Assistant Examiner* — Aaron M Rodziwicz
(74) *Attorney, Agent, or Firm* — Snell & Wilmer, L.L.P.

(57) ABSTRACT

An ice protection system for an aircraft may comprise an electric heater embedded within a composite aircraft component. In the event of malfunction of the embedded heater, a secondary heater may be attached to an interior surface of the composite aircraft component. The wiring may be detached from the embedded heater and attached to the secondary heater. The secondary heater may be used to provide ice protection to the composite aircraft component.

5 Claims, 5 Drawing Sheets

EMBEDDED AIRCRAFT HEATER REPAIR

FIELD

The present disclosure relates to anti-icing and deicing systems, and more particularly, to anti-icing and deicing systems for aircraft nacelles and other aircraft components and surfaces.

BACKGROUND

Inlets for aircraft nacelles, wing leading edges, horizontal stabilizers, vertical fins, and other aircraft components may be subject to ice build-up during flight. A heat source may heat the components to prevent the ice build-up or to remove ice after it has built up. The heat source most commonly used today is hot bleed air from a gas turbine engine that heats the backside of the external surface subject to ice build-up. Electric resistance heating has also been proposed and is entering service in a small number of applications.

The material and design of the heated surface and associated structure is typically designed to withstand the possibility of the maximum temperature (which is usually heavy aircraft take-off on a hot, dry ambient day at sea-level, even though this condition may occur infrequently. This condition often drives the design of the heated components, resulting in heavier structures to withstand thermal expansion and/or more expensive materials resistant to the heat.

To achieve efficient electric ice protection, it may be desirable to install heater elements close to the external surface. However, if such elements get damaged or broken, it may be difficult to repair the elements without removing the aircraft or engine from service.

SUMMARY

A method may comprise detecting a malfunction in an embedded electric heater in an aircraft component; coupling a secondary heater to an interior surface of the aircraft component; detaching a wire from the embedded electric heater; and coupling the wire to the secondary heater.

In various embodiments, the secondary heater may comprise an aperture. The secondary heater may be coupled to the aircraft component such that an electrical contact of the embedded electric heater protrudes through the aperture. An amount of power supplied to the secondary heater may be greater than the amount of power that was supplied to the embedded electric heater, or the time that the heater is energized may be increased. An external surface of the aircraft component may be anti-iced or deiced using the secondary heater. The secondary heater may comprise an electric heater. The embedded electric heater may be located between layers of a composite laminate.

A method of repairing an ice protection system may comprise coupling a secondary heater to an interior surface of a composite aircraft component; detaching a wire from a first electrical contact coupled to the composite aircraft component; and coupling the wire to a second electrical contact coupled to the secondary heater.

In various embodiments, the first electrical contact may be coupled to an embedded heater embedded within the composite aircraft component. A malfunction of an electric heater embedded within the composite aircraft component may be detected. An amount of power supplied to the secondary heater may be greater than the amount of power that was supplied to the primary heater, or the time that the heater is energized may be increased. The secondary heater may be bonded to the composite aircraft component. An external surface of the composite aircraft component may be anti-iced or deiced using the secondary heater. An aperture in the secondary heater may be aligned with the first electrical contact.

An ice protection system may comprise a first heating element embedded within an aircraft component; a first electrical contact coupled to the first heating element, wherein the first electrical contact protrudes through an interior surface of the aircraft component; and a second heating element coupled to the interior surface of the aircraft component.

In various embodiments, the second heating element may comprise an aperture. The first electrical contact may protrude through the aperture in the second heating element. A second electrical contact may be coupled to the second heating element. An Ice Protection Control Unit may be configured to provide power to the first heating element or the second heating element. The Ice Protection Control Unit may be configured to increase an amount of power, or the amount of time electricity is supplied to the second heating element in response to a malfunction of the first heating element.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
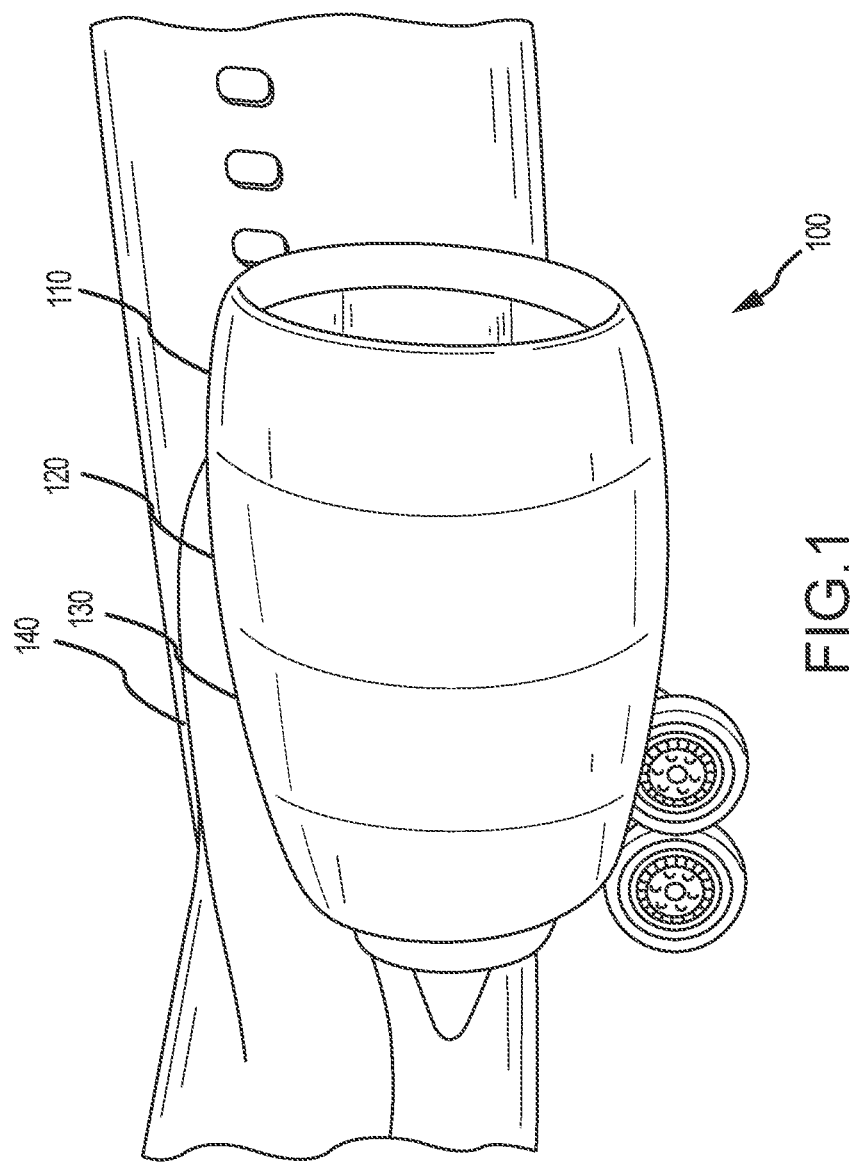
FIG. 1 illustrates a perspective view of a nacelle for an aircraft in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Preventing ice build-up is typically referred to as "anti-icing," while removing ice build-up already attached to the aircraft surface is referred to as "deicing." A system which provides both anti-icing capability and deicing capability is referred to herein as a deicing system or an ice protection system for simplicity.

Systems and methods for repairing damaged ice protection systems are disclosed. An ice protection system may comprise one or more heating elements embedded in a composite laminate. The heating element may be located close to the external surface of the composite laminate to decrease the amount of heat associated with providing ice protection to the external surface of the composite laminate. For example, in a composite laminate comprising ten composite plies, the heating element may be located two plies away from the external surface. However, the heating element may become damaged in some circumstances. For example, contact from external objects during flight may damage the heating element. To repair the ice protection system, rather than removing the component from service, a secondary heating element may be attached to the interior surface of the composite laminate. The electric wiring may be detached from the damaged heating element and attached to the secondary heating element. As the secondary heating element is located at a greater distance from the external surface than the damaged heating element, a greater amount of power or an increased dwell period for the dwell cycle may be directed to the secondary heating element to provide sufficient heat to deice the composite laminate.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. The nacelle 100 may be disposed about a centerline, which may also be the axis of rotation of an engine located within the nacelle 100. Ice may build up on the inlet 110. An electric heater may be embedded between composite layers of the inlet 110 or other aircraft components in a known manner in order to prevent ice from forming, or to melt ice present on the inlet 110 or on portions of the aircraft wing or aircraft body, as illustrative examples.

Figure 2A:
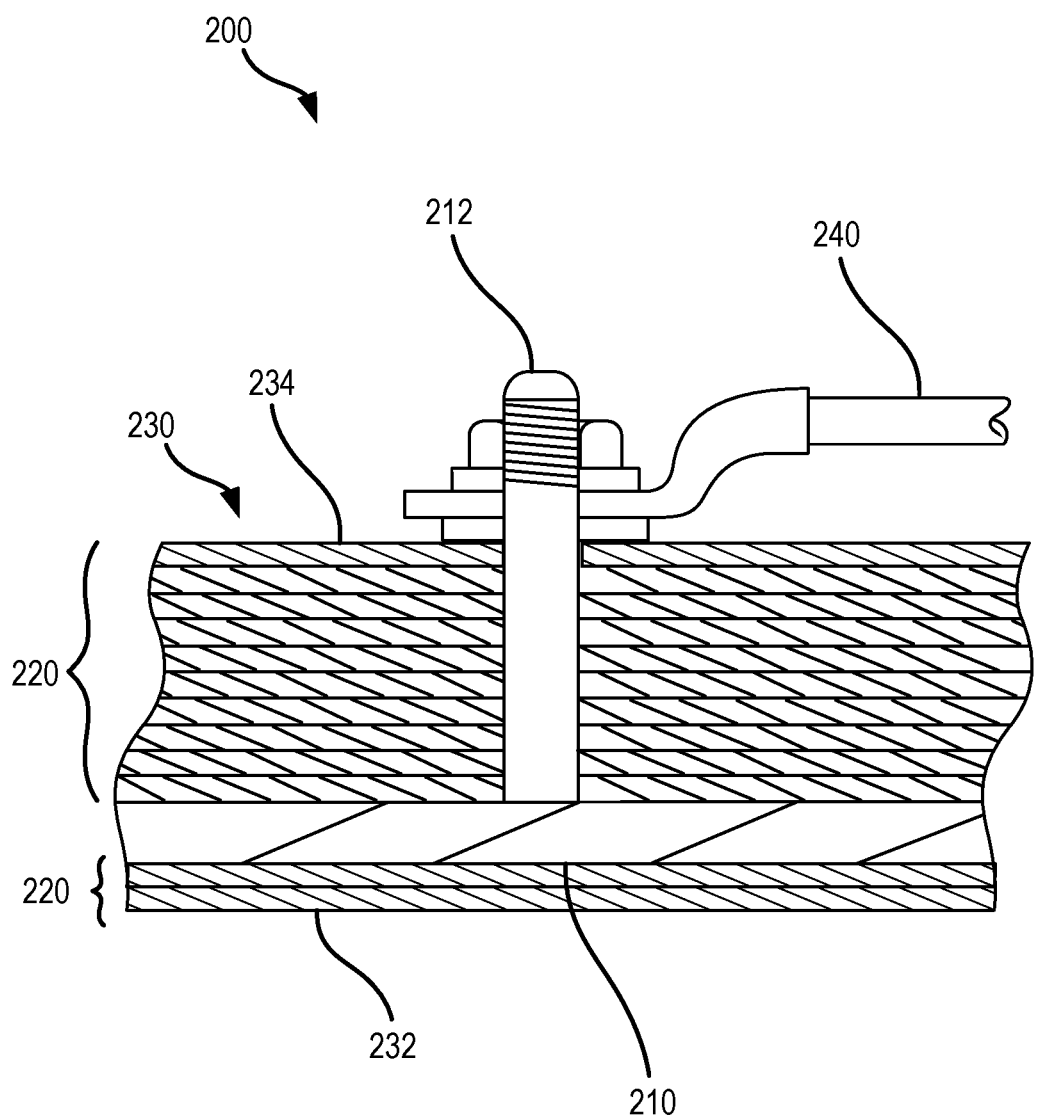
FIG. 2A illustrates a schematic view of an ice protection system in accordance with various embodiments.
Figure 2B:
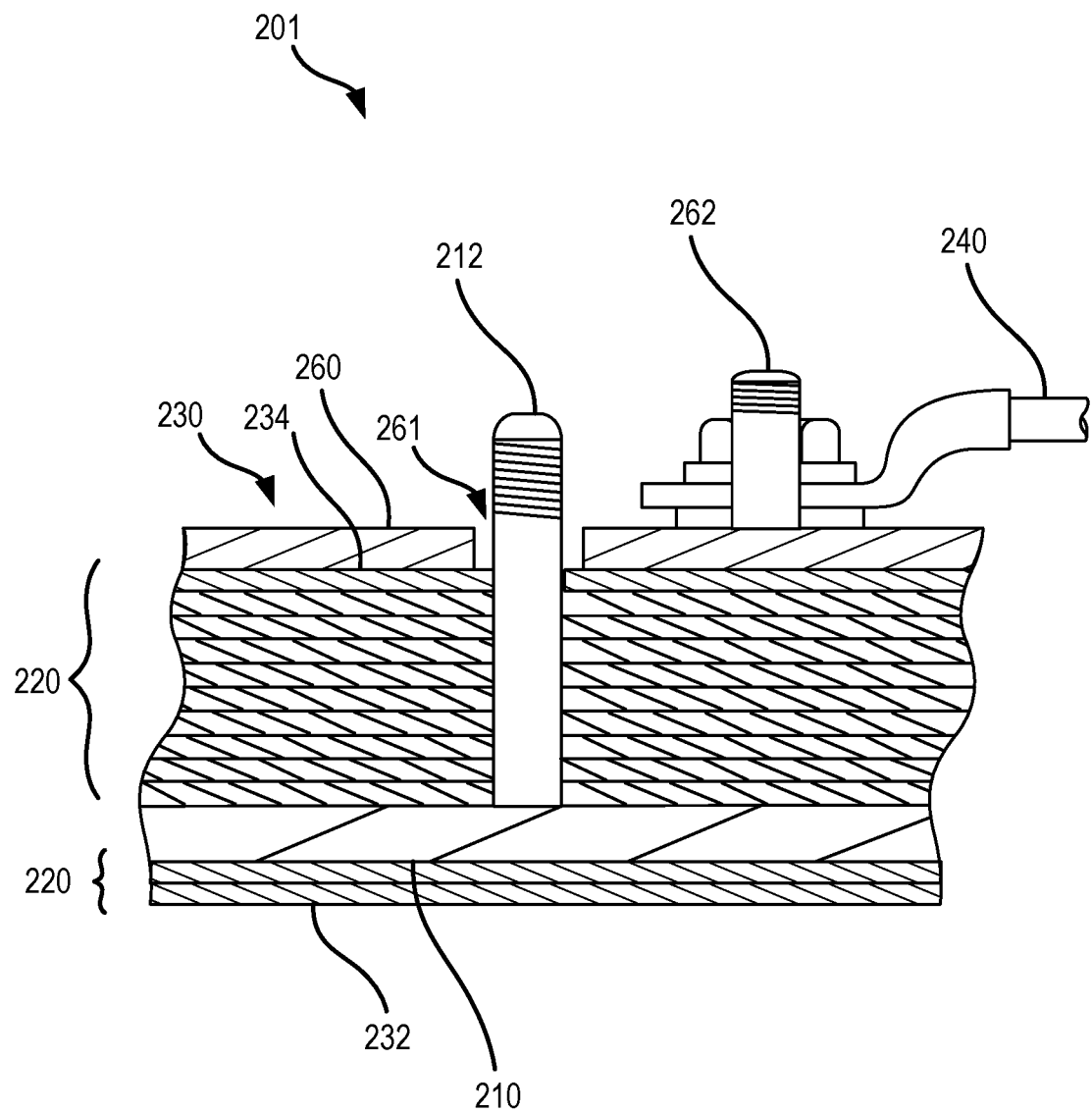
FIG. 2B illustrates a schematic view of a repaired ice protection system in accordance with various embodiments.

Referring to FIGS. 2A and 2B, a schematic view of an ice protection system 200 is illustrated according to various embodiments. The ice protection system 200 may comprise an electric heating element 210 embedded between laminate layers 220 of a composite aircraft component 230. The aircraft component 230 may be a component which is subject to icing, such as an inlet for a nacelle or a leading edge of an aircraft wing (e.g. inlet 110 in FIG. 1). The electric heating element 210 may comprise a resistance heater which converts electricity to heat to melt ice or prevent ice from forming on an exterior surface 232 of the component 230. Locating the heating element between laminate layers 220, as opposed to on the interior surface 234 of the aircraft component 230 may decrease the amount of power associated with sufficiently heating the exterior surface 232 and provide deicing capabilities. As illustrated, the heating element 210 is separated from the exterior surface 232 by two laminate layers 220. However, those skilled in the art will recognize that the heating element 210 may be separated from the exterior surface 232 by any suitable number of laminate layers 220. One or more electrical contacts 212 may extend from the electric heating element 210 and protrude through the interior surface 234 of the aircraft component. Wires 240 or other components capable of transmitting electricity may be coupled to the electrical contacts 212 to supply electricity to the electric heating element 210.

A full authority digital engine (or electronics) control ("FADEC") or other electronic controller may monitor engine and atmospheric conditions and command the system via an Ice Protection Control Unit ("IPCU") to provide power to the electric heating element 210 based on the conditions. The IPCU may automatically provide power without input from a pilot. In various embodiments, the ice protection system may be initiated during conditions where there is no ice build-up, or where there is unlikely to be ice build-up. The supplied power may vary in response to atmospheric conditions, such as temperature and relative humidity, that may influence the rate of ice formation on an aircraft. Similarly, the supplied power may be varied in response to the weight on the landing gear, as an aircraft on the ground may be subjected to different deicing temperatures compared to an aircraft in flight.

Referring to FIG. 2B, a repaired ice protection system 201 with a secondary heating element 260 is illustrated according to various embodiments. In various circumstances, the heating element 210 may get damaged or otherwise cease to properly function. The IPCU may detect that the heating element 210 is not functioning properly. For example, the IPCU may detect a lower than expected current or a change to the heater resistance in the wires 240. In various embodiments, maintenance personnel may detect that the heating element 210 is malfunctioning during on-ground inspection or maintenance.

The secondary heating element 260 may be coupled to the interior surface 234 of the aircraft component 230. In various embodiments, the secondary heating element 260 may be installed after detecting a malfunction of the heating element 210. However, in various embodiments, the secondary heating element 260 may be permanently installed as a redundant system. The secondary heating element 260 may be coupled to the aircraft component 230 by any suitable method, such as bonding, bolting, riveting, etc. The secondary heating element may comprise apertures 261. The apertures 261 may be located such that the electrical contacts 212 protrude through the apertures 261. In various embodiments, an insulator may be located within the apertures 261 to prevent unintended electrical contact between the electrical contacts 212 and the secondary heating element 260. The secondary heating element 260 may comprise electrical contacts 262. The wires 240 may be detached from the electrical contacts 212 and attached to the electrical contacts 262. The IPCU may supply electricity to the secondary heating element 260 to provide ice protection to the aircraft component 230. The secondary heating element 260 may be separated from the exterior surface 232 by a greater distance and number of laminate layers 220 as compared to the heating element 210. Thus, in order to provide an equivalent amount of anti-icing or deicing capability, the IPCU may increase the amount of power or the dwell time supplied to the secondary heating element 260. In various embodiments, the pilot or mechanic may indicate to the IPCU that the secondary heating element 260 is being used. In various embodiments, the IPCU may detect that the secondary heating element 260 is being used and automatically increase the power level.

Figure 3:
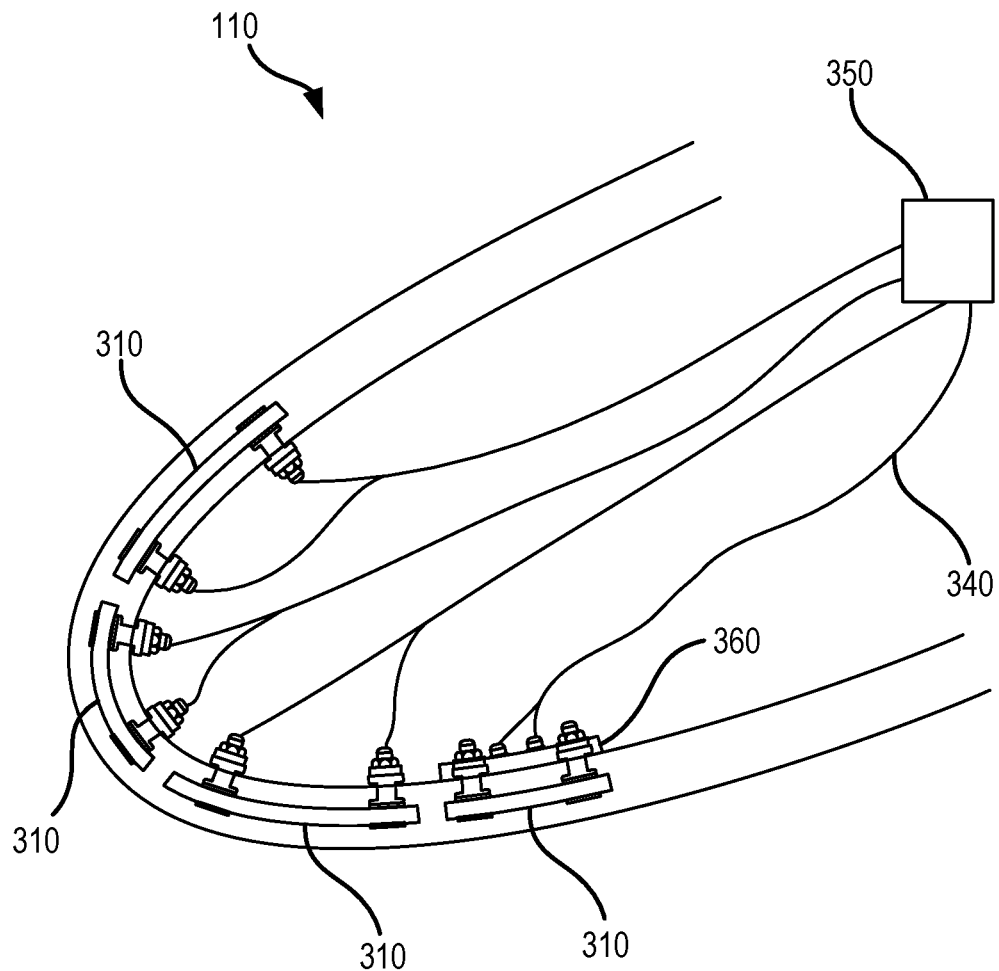
FIG. 3 illustrates a schematic view of an ice protection system in a nacelle inlet in accordance with various embodiments.

Referring to FIG. 3, a schematic cross-section view of a nacelle inlet 110 is illustrated according to various embodiments. The inlet 110 may comprise a plurality of embedded heating elements 310. Each heating element 310 may extend around a portion of a circumference of the inlet 110. In various embodiments, each heating element 310 may extend 60, 90, 120, or any other suitable distance around the circumference of inlet 110. In response to one of the heating elements 310 malfunctioning, a secondary element 360 may be installed on the interior of the inlet 110 and in the area of the malfunctioning heating element. Thus, the inlet 110 may remain in service with the secondary element 360, which may be installed quickly and with minimal additional weight. The wires 340 may be detached from the malfunctioning heating element and attached to the secondary element 360. The IPCU 350 may provide power to the secondary element 360 and the remaining functioning heating elements 310.

Figure 4:
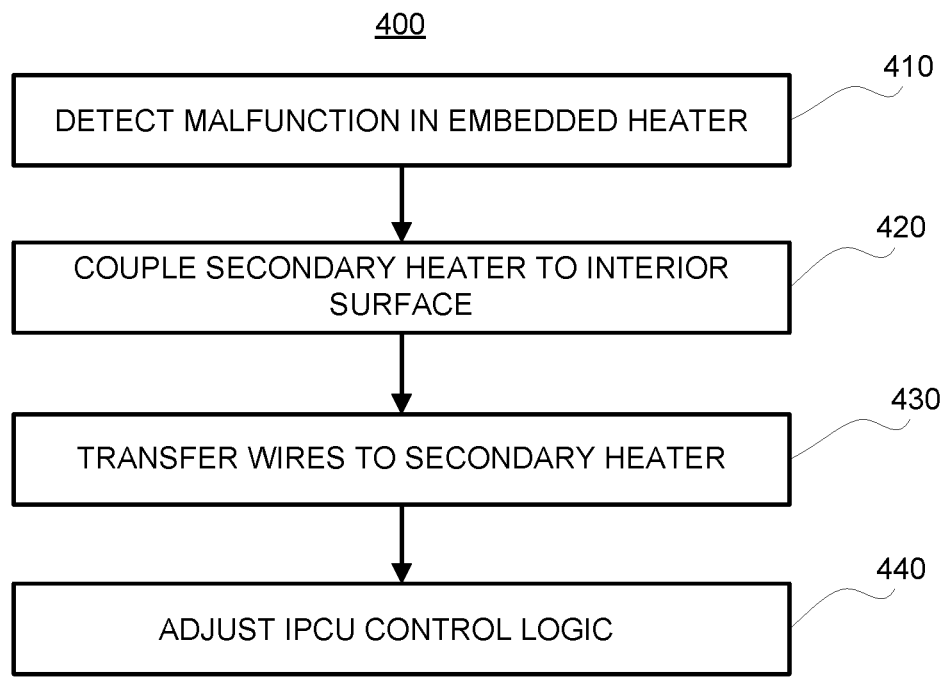
FIG. 4 illustrates a flowchart of a process for repairing an ice protection system, in accordance with various embodiments.

Referring to FIG. 4, a flowchart 400 of a process for repairing an ice protection system is illustrated according to various embodiments. A malfunction may be detected in an electric heater embedded within an aircraft component (step 410). In various embodiments, the malfunction may be detected during an inspection or maintenance. In various embodiments, the malfunction may be detected by an aircraft system, such as an IPCU. A secondary electric heater may be coupled to the interior surface of the aircraft component (step 420). The secondary electric heater may comprise apertures which are aligned with electrical contacts coupled to the embedded electric heater. The secondary electric heater may comprise electrical contacts. Wires may be detached from the electrical contacts of the embedded electric heater and coupled to the electrical contacts of the secondary electric heater (step 430). The control logic of the IPCU may be adjusted, such that a greater amount of power is supplied to the secondary electric heater during anti-icing or deicing as compared to the amount of power previously supplied to the embedded electric heater (step 440).

Although described primarily with reference to nacelle inlets, those skilled in the art will recognize that the deicing system disclosed herein may be utilized in any portion of an aircraft which provides deicing capabilities, as well as in non-aircraft deicing systems.

In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A method of repairing an ice protection system comprising:
    detaching a wire from a first electrical contact coupled to an embedded heater within a composite aircraft component, wherein the embedded heater is embedded between laminate layers of the composite aircraft component, and wherein the first electrical contact protrudes through an interior surface of the composite aircraft component;
    aligning an aperture of a secondary heater to the first electrical contact;
    coupling the secondary heater to the interior surface of the composite aircraft component;
    coupling the wire to a second electrical contact coupled to the secondary heater.

2. The method of claim 1, further comprising:
    supplying a first power to the embedded heater prior to detaching the wire;
    detecting a malfunction of the embedded heater embedded within the composite aircraft component prior to detaching the wire; and
    supplying a second power to the secondary heater, the second power being greater than the first power.

3. The method of claim 1, wherein the secondary heater is bonded to the composite aircraft component.

4. The method of claim 1, further comprising anti-icing or deicing an external surface of the composite aircraft component using the secondary heater.

5. The method of claim 1, further comprising:
supplying a first dwell time cycle for a first duration to the embedded heater prior to detaching the wire;
detecting a malfunction of the embedded heater embedded within the composite aircraft component prior to detaching the wire; and
supplying a second dwell time cycle for a second duration to the secondary heater, the second duration being greater than the first duration.

* * * * *